United States Patent
Smith et al.

(10) Patent No.: US 9,614,722 B2
(45) Date of Patent: *Apr. 4, 2017

(54) METHOD AND APPARATUS FOR MONITORING CONNECTIVITY IN A LONG TERM EVOLUTION NETWORK

(71) Applicant: AT&T Intellectual Property I, L.P., Atlanta, GA (US)

(72) Inventors: Donald Smith, San Ramon, CA (US); Wenge Chen, Austin, TX (US); Kuo-Hui Liu, San Ramon, CA (US); Chou Lan Pok, San Ramon, CA (US); Mohammad M. Islam, Merrimack, NH (US); Michael Recchia, Bradenton, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,873

(22) Filed: Jun. 15, 2015

(65) Prior Publication Data

US 2015/0280974 A1   Oct. 1, 2015

Related U.S. Application Data

(63) Continuation of application No. 13/330,238, filed on Dec. 19, 2011, now Pat. No. 9,059,903.

(51) Int. Cl.
*H04L 12/26* (2006.01)
*H04L 12/24* (2006.01)
(Continued)

(52) U.S. Cl.
CPC ...... *H04L 41/0677* (2013.01); *H04L 41/5038* (2013.01); *H04L 43/0811* (2013.01); *H04L 43/0841* (2013.01); *H04L 43/50* (2013.01); *H04L 61/2046* (2013.01); *H04W 24/06* (2013.01); *H04L 43/06* (2013.01);
(Continued)

(58) Field of Classification Search
CPC ............ H04L 41/0677; H04L 41/5038; H04L 43/0811; H04L 43/06; H04L 43/10; H04L 43/0858; H04L 43/0864; H04L 43/0876; H04L 43/0829
See application file for complete search history.

(56) References Cited

U.S. PATENT DOCUMENTS 8,040,811 B2   10/2011   Edwards et al.
9,059,903 B2    6/2015   Smith et al.
(Continued)

*Primary Examiner* — Luat Phung

(57) ABSTRACT

A method and apparatus for monitoring connectivity in a network at a bearer path layer are disclosed. For example, the method receives a request to monitor a user endpoint, identifies an internet protocol address of the user endpoint, an internet protocol address of each transport network element between the user endpoint and a bearer trace server, a bearer path identification of each bearer used by the user endpoint, a quality of service associated with each bearer used by the user endpoint, and a tunnel identification of each bearer used by the user endpoint; and performs a fault isolation and performance monitoring at a bearer path layer, wherein the fault isolation identifies a particular segment where a fault is detected at the bearer path layer.

20 Claims, 5 Drawing Sheets

(51) Int. Cl.
*H04L 29/12* (2006.01)
*H04W 24/06* (2009.01)

(52) U.S. Cl.
CPC ...... *H04L 43/0829* (2013.01); *H04L 43/0858* (2013.01); *H04L 43/0864* (2013.01); *H04L 43/0876* (2013.01); *H04L 43/10* (2013.01)

(56) References Cited

U.S. PATENT DOCUMENTS

| | | | |
|---|---|---|---|
| 2003/0128706 A1* | 7/2003 | Mark | H04L 12/2852 370/395.1 |
| 2004/0179504 A1* | 9/2004 | Kim | H04W 24/00 370/338 |
| 2008/0159195 A1 | 7/2008 | Kappler et al. | |
| 2008/0239957 A1 | 10/2008 | Tokura et al. | |
| 2008/0316972 A1 | 12/2008 | Shaheen | |
| 2009/0135751 A1* | 5/2009 | Hodges | G06F 1/3209 370/311 |
| 2010/0118724 A1 | 5/2010 | Hirsch et al. | |
| 2011/0072288 A1 | 3/2011 | Miller et al. | |
| 2011/0222414 A1 | 9/2011 | Borsos et al. | |
| 2011/0294500 A1 | 12/2011 | Chang et al. | |
| 2012/0188928 A1 | 7/2012 | Wang et al. | |

\* cited by examiner

METHOD AND APPARATUS FOR MONITORING CONNECTIVITY IN A LONG TERM EVOLUTION NETWORK

This application is a continuation of U.S. patent application Ser. No. 13/330,238, filed Dec. 19, 2011, now U.S. Pat. No. 9,059,903, which is herein incorporated by reference in its entirety.

The present disclosure relates generally to communication network and, more particularly, to a method and apparatus for monitoring a connectivity in a wireless network, e.g., a Long Term Evolution (LTE) network.

BACKGROUND

When a user endpoint (UE) accesses a packet data network the user's endpoint may have one or more connections to the packet data network (PDN) and each of the one or more connections may have one or more bearers. The data traffic to and from the user's endpoint is carried by one or more bearers. For each of the bearers used by a UE, a separate General packet radio service (GPRS) Tunneling Protocol for User data tunneling (GTP-U) tunnel identification (TEID) data (broadly, tunnel identification) is used. Each bearer may provide a specific quality of service (QoS) and an associated quality of class identifier (QCI). However, today connectivity between the user's endpoint and the packet data network is monitored at an aggregate level for all users using internet protocol (IP) transport layer information for one or more segments of the path. The monitoring of data at the internet protocol path layer provides no bearer level performance information about a specific user endpoint's connections to the packet data network at various GTP segments of that path.

SUMMARY

In one embodiment, the present disclosure provides a method and an apparatus for monitoring a connectivity in a network at a bearer path layer. For example, the method receives a request to monitor a user endpoint, identifies an internet protocol address of the user endpoint, an internet protocol address of each transport network element between the user endpoint and a bearer trace server, a bearer path identification of each bearer used by the user endpoint, a quality of service associated with each bearer used by the user endpoint, and a tunnel identification of each bearer used by the user endpoint; and performs a fault isolation at a bearer path layer, wherein the fault isolation identifies a particular segment where a fault is detected at the bearer path layer.

BRIEF DESCRIPTION OF THE DRAWINGS

The teaching of the present disclosure can be readily understood by considering the following detailed description in conjunction with the accompanying drawings, in which.

DETAILED DESCRIPTION

The present disclosure broadly describes a method and an apparatus for monitoring connectivity and bearer layer performance in a wireless network, e.g., a Long Term Evolution (LTE) network. Although the teachings of the present disclosure are discussed below in the context of LTE networks, the teaching is not so limited. Namely, the teachings of the present disclosure can be applied for other types of wireless or cellular networks in accordance with other standards, e.g., 2G networks, 3G networks, etc.

3GPP is a global effort to define a wireless communication system specification. In 3GPP release 8, LTE is a set of enhancements to the Universal Mobile Telecommunications System (UMTS) which focuses on adopting 4th Generation (4G) mobile communications technology, including an all Internet Protocol (IP) end-to-end network architecture. Broadly defined, an eNodeB is a radio base transceiver station (RBS) as per the 3GPP standards (or simply referred to as a base station). An eNodeB provides the LTE air interface and performs radio resource management for wireless access.

In a 3GPP Long Term Evolution (LTE) network, connectivity may be disrupted at various layers of a network. For example, the internet protocol layer may operate normally while a user endpoint is experiencing poor quality of service.

To address this criticality, the present method and apparatus provides for real time monitoring of user connectivity at the bearer path layer. The method provides performance measurements for each of the user's bearers. For example, the method measures round trip times such as but not limited to (RTTs), available bit rates, packet loss ratios, and packet delay variations (a.k.a. Jitter): between an eNodeB that a bearer is using and a server in the packet network; for each segment along a traversed path between the eNodeB and the server in the packet network, etc. If a particular connectivity is found to be faulty, the method can then isolate the fault to a specific segment of the network.

Figure 1:
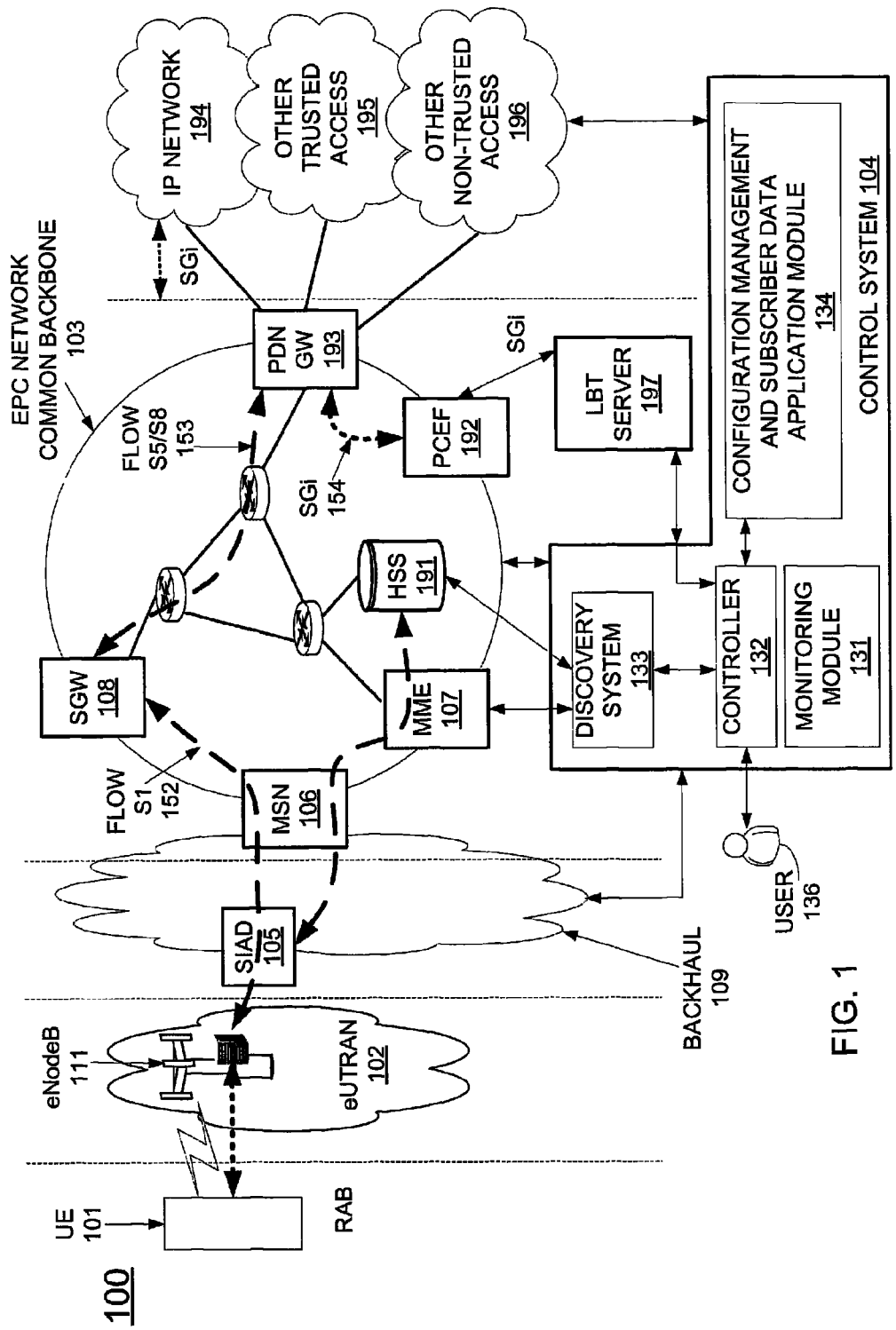
FIG. 1 illustrates an exemplary LTE network related to the present disclosure.

FIG. 1 illustrates an exemplary LTE network 100 related to the present disclosure. In one illustrative embodiment, the LTE network 100 comprises an access network 102 (e.g., an evolved Universal Terrestrial Radio Access Network (eUTRAN)), a backhaul network 109, a core network 103 (e.g., an Evolved Packet Core (EPC) network), and a control system 104, e.g., supported and operated by a wireless service provider. It should be noted that control system 104 can be deployed in any of the network illustrated in FIG. 1. Furthermore, although various networks are shown as separate networks in FIG. 1, it is possible that functions performed by these networks can be combined into fewer networks or expanded into a greater number of networks depending on the deployment requirements.

In one illustrative example, the eUTRAN, e.g., eUTRAN 102, may comprise one or more eNodeBs, e.g., 111. In operation, user equipment or user endpoint (UE) 101 may access wireless services via an eNodeB, e.g., eNodeB 111 in the eUTRAN 102. UE 101 can be a smart phone, a cellular phone, a computing tablet, a computer or laptop, or any endpoint communication devices equipped with wireless capabilities. An eNodeB, such as eNodeB 111, provides wireless interfaces to one or more UE devices. All eNodeBs in the eUTRAN 102 are connected to the EPC network 103 via one or more integrated access devices 105 (e.g., a Smart Integrated Access Device (SIAD)) located in a backhaul network 109. Broadly, an integrated access device is capable of integrating both voice and data services within a single device. In one embodiment, eNodeB 111 supports wireless services covered by one or more cell sites located in eUTRAN 102. It should be noted that any number of eNodeBs can be deployed.

In one embodiment, eUTRAN 102 is connected to the EPC network 103 via the backhaul network 109. For example, SIAD 105 in the backhaul network 109 is connected to the EPC network 103 via a Multi-service Node (MSN) 106. An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In one embodiment, the SIAD is a device that provides wireless traffic aggregation and backhaul from a cell site to an EPC network. An MSN provides layer 2 and layer 3 networking functions for wireless service between one or more SIADs and the EPC network. The eUTRAN 102 is the air interface of the 3GPP's Long Term Evolution (LTE) specifications for mobile networks. Namely, the eUTRAN comprises a radio access network standard that will replace previous generations of air interface standards.

In one embodiment, the SIAD 105 and the MSN 106 communicate over a backhaul network 109. The backhaul network may also be referred to as a metro Ethernet transport network.

In EPC network 103, network devices such as Mobility Management Entity (MME) 107 and Serving Gateway (SGW) 108 support various functions as part of the LTE network 100. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers.

In addition, EPC (common backbone) network 103 may comprise a Home Subscriber Server (HSS) 191 that contains subscription-related information (e.g., subscriber profiles), performs authentication and authorization of a wireless service user, and provides information about the subscriber's location. The EPC network 103 may also comprise a Policy and Charging Enforcement Point (PCEF) 192 that supports accesses to subscriber databases and specialized functions of a charging system. The EPC network 103 may also comprise a Public Data Network Gateway (PDN GW) 193 which serves as a gateway that provides access between the EPC network 103 and various data networks, e.g., other IP networks, trusted or non-trusted networks 194-196 and the like. The PDN GW may also be referred to as a PGW. PGW also serves as the anchor for mobility between LTE and other wireless technologies, such as 2G and 3G wireless networks. It should be noted that the above illustrated LTE network 100 is only illustrative and the number of network components or elements are not specifically limited as shown. Any number of network components or elements can be deployed.

In one embodiment, the control system 104 comprises a collection of modules that provides monitoring connectivity in the LTE network. For example, the control system 104 may comprise a network monitoring module 131, a controller 132, a discovery module (discovery subsystem) 133, a configuration management and subscriber data application module 134. In fact, in one embodiment, the control system 104 may also include the LBT server 197 as discussed below. The functions performed by these modules will be described below. It should be noted that these various modules may perform other functions. Only the functions relates to the present disclosure are herein described. Furthermore, although these modules are illustrated as separate modules, the functions performed by these modules can be implemented in one or more hardware systems, e.g., in a single application server, in a plurality of application servers, and the like.

In one embodiment, the eUTRAN network 102, the backhaul network 109 and the EPC network 103 include various data bearer paths and signaling bearer paths. The various bearer paths may be referred to by specific labels. For example, the data bearer path on line 152 may be referred to as an S1-U bearer path and the data bearer path on line 153 may be referred to as an S5 or an S8 bearer path. In another example, the signaling bearer path between the eUTRAN and the MME 107 may be referred to as an S1-MME bearer path. Note that the S1, S5, S8 and SGi interfaces are standard interfaces defined by the 3GPP standard. It should be noted that the present disclosure is not limited to these specific interfaces.

Shown illustratively in FIG. 1, the S1 interface flow 152 is used to provide communication between an eNodeB, such as eNodeB 111, and a device in the EPC network 103, such as MME 107 and/or SGW 108. The SGi interface flow 154 is used to provide communication between the PGW 193 (also referred to as PDN GW 193) and the PCEF 192. The S5/S8 interface flow 153 is used to provide communication between the SGW 108 and PGW 193.

In one embodiment, the network monitoring module 131 monitors network elements in EPC 103 and reports troubles to a controller 132. In one embodiment, the configuration management and subscriber data application module 134 may provide additional information as needed, e.g., such as node identity based on the network configuration data. The controller 132 processes commands received from a user 136, e.g., commands to monitor one or more UEs. For example, UE 101 may be experiencing a degradation of service quality. The monitoring of data at the internet protocol and path layers provides no information about a specific user endpoint's connections and experience to the packet data network. For example, UE 101 may be experiencing service degradation and the fault may not be detectable at the internet protocol and path layers.

In one embodiment, the present disclosure provides bearer path layer connectivity and performance monitoring such that fault isolation may be performed at the bearer path layer. Fault isolation at the bearer path layer enables identification of a particular network segment wherein the fault is located, such as an indication that a silent packet forwarding issue exists. For example, if UE 101 is experiencing service degradation, a user 136 (e.g., a work center personnel) may issue a command to the controller 132 to monitor bearer paths used for packets to and from the UE 101. In turn, the controller 132 is able to invoke fault isolation. In order to perform the fault isolation for a particular UE, the current method sends bearer path layer trace packets (broadly bearer trace packets) from a server on the same bearer paths traversed by the subscriber's packets of the particular UE. Thus, the bearer trace packets and the subscriber's packets experience a same level of service (e.g., a same level of degradation) while utilizing each bearer path. The server used to send the bearer path layer trace packets and receive the corresponding responses is referred to as a long term evolution bearer trace (LBT) server (broadly referred to as a bearer trace server). For example, FIG. 1 illustrates an LBT server 197 that may be used to send the bearer path layer trace packets.

In order to transmit the trace packets on the same bearer paths traversed by the subscriber's packets, the controller first needs to know the particular bearer paths used for the subscriber's packets. In one embodiment, the controller 132 engages the discovery subsystem 133 in order to identify the internet protocol addresses of the UE and the transport network elements between the UE and the LBT server. In one embodiment of a discovery subsystem, 133, first determines the internet protocol address of the MME being used by the particular UE from the home subscriber server. For example, for the UE 101 illustrated in FIG. 1, the discovery subsystem 133 may access the HSS 191 to determine the IP address of the MME 107. The discovery subsystem 133 then interacts with the MME 107 to determine: the IP addresses of the UE, eNodeB, SGW, PGW, PCEF, etc. between the LBT server and the UE, bearer identification of each of the bearers used by the UE, a quality of service (QoS) associated with each bearer, and General packet radio service Tunneling Protocol for User data tunneling (GTP-U) tunnel identification (TEID) data (broadly, tunnel identification) of each of the bearers used by the UE.

Note that a UE may have multiple connections to the EPC network involving any number of PGWs simultaneously. The UE would then have a different IP address for each of the connections. In addition, each connection may involve multiple PGWs and/or SGWs. The discovery subsystem described above may then be used to discover each IP address of the UE, and the respective IP addresses of the eNodeB, SGW, PGW, PCEF, etc. between the LBT server and the UE.

Figure 2:
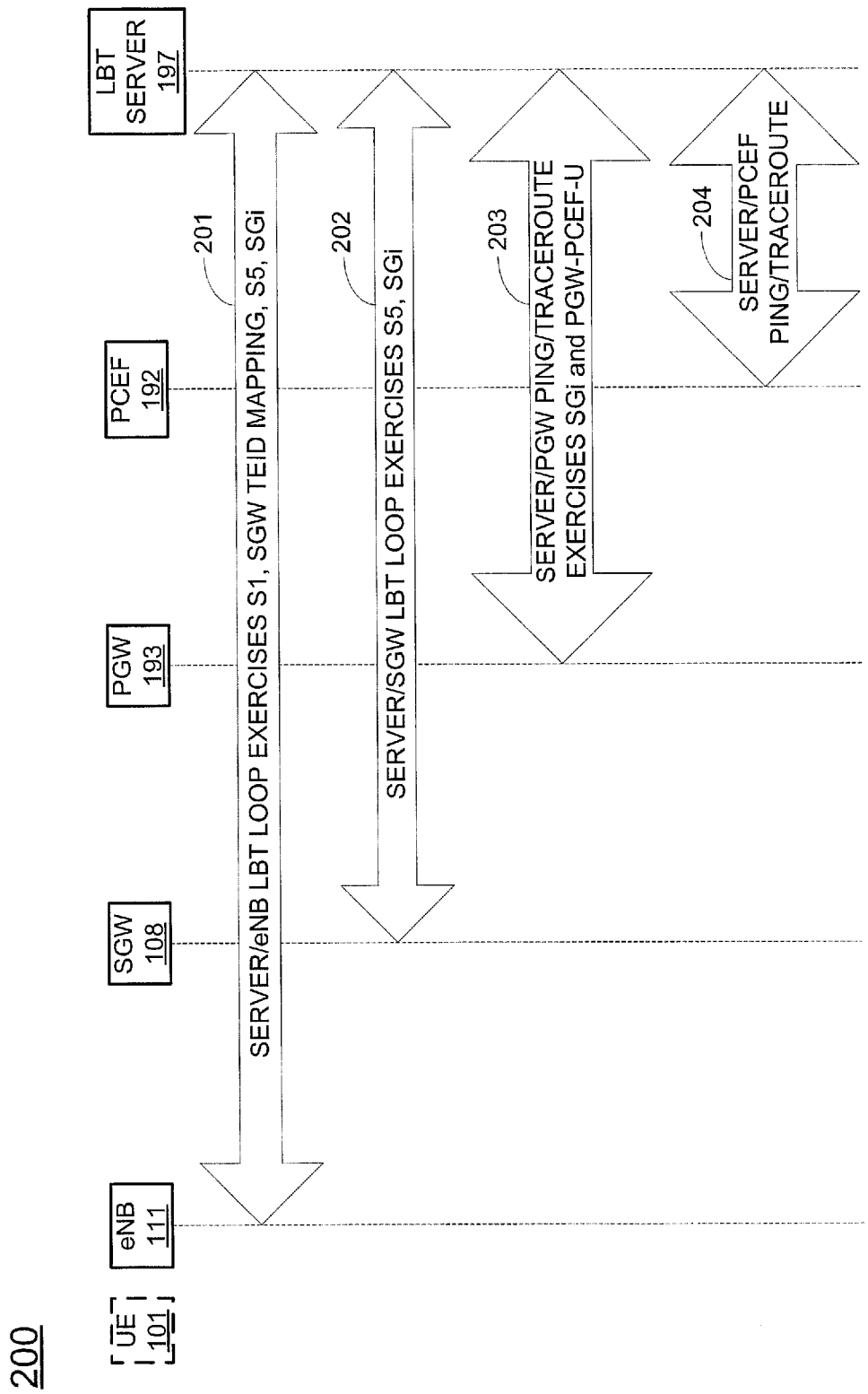
FIG. 2 illustrates an exemplary continuity monitoring at a bearer path layer.

FIG. 2 illustrates an exemplary continuity monitoring 200 at a bearer path layer. The continuity monitoring 200 is used to isolate faults to a segment between the eNodeB 111 and the LBT server 197, and to perform performance measurements. The fault isolation is accomplished by using one or more LBT request/response loops (broadly referred to as request/response loops) combined with one or more enhanced trace-route loops. The enhanced trace-route loop is also referred to as a ping/trace-route loop. Other request/response protocols, Two-Way Active Measurement Protocol (TWAMP) being one example of many, may be used in addition to or instead of ping or traceroute.

Note that the end-to-end service comprises: S1 bearer paths between an eNodeB and an SGW; S5/S8 bearer paths between the SGW and a PGW; and one or more SGi bearer paths (between the PGW and a PCEF and between the PCEF and a server). Each S1 and S5/S8 bearer path is carried by GTP tunnels in the uplink and downlink directions. The LBT request/response loops exercise these GTP tunnels in both the uplink and downlink directions. The ping/trace-route loops are used for exercising loops that do not involve GTP tunnels.

The LBT request/response loops are used for isolating a fault to a segment, wherein the fault is between the eNodeB and the SGW. An LBT request/response loop and an enhanced trace-route loop are used for isolating a fault to a segment, wherein the fault is between the SGW and the PGW. The enhanced trace-route loops are used for isolating a fault to a segment, wherein the fault is either between the PGW and the PCEF or between the PCEF and the LBT server.

The destination address for an LBT request/response loop is an IP address of the network transport device intended to reflect back the message in the form of a response. For example, in FIG. 2, the LBT requests for exercising loops 201 and 202 originate in the LBT server 197. The destination of the LBT request for exercising loop 201 is the eNodeB 111. The destination of the LBT request for exercising loop 202 is the SGW 108. The LBT requests are then reflected in accordance with the respective destination. The eNodeB 111 provides a response for loop 201 and SGW 108 provides a response for loop 202.

The destination address for an enhanced trace-route loop is the IP address of the UE, so the path taken by the trace route packet is the same as that of the user packets. Note that an ordinary ping to the IP address of the UE would not be reflected back by the PCEF or PGW. However, a ping to the IP address of the PGW and PCEF would follow the path of the user's packets. Thus, the enhancement (i.e., a ping addressed to the PGW or PCEF along with the trace functionality) enables the enhanced trace-route packets to take the same path taken by the user packets. Thus, the destinations of the enhanced trace-route loops for exercising loops 203 and 204 are that of the UE 101. For example, in FIG. 2, the enhanced trace-route loops (ping/trace-route loops) for exercising loops 203 and 204 originate in the LBT server 197. However, the ping for loop 203 has a destination, wherein the destination is the IP address of the PGW 193. Similarly, the ping for loop 203 has a destination, wherein the destination is the IP address of the PCEF 192.

A single failure on any segment, by using two enhanced trace-route loops and two LBT request/response loops, may then be detected and isolated to a particular segment between the LBT server and the eNodeB. For example, in FIG. 2, if the LBT request/response for loop 201 is not successful and the LBT request/response for loop 202 is successful, a fault is detected between the eNodeB 111 and the SGW 108. In another example, if the LBT request/response for loop 202 is not successful and the ping/trace-route loop 203 is successful, a fault is detected between the SGW 108 and the PGW 193. In another example, if the ping/trace-route loop 203 is not successful and the ping/trace-route loop 204 is successful, a fault is detected between the PGW 193 and the PCEF 192. In another example, if the ping/trace-route loop 204 is not successful, a fault is detected between the PCEF 192 and the LBT server 197.

Similarly, a round-trip-time may be measured for each segment. Note that the LBT request/response loops and the enhanced trace-route loops carry timestamps and sequence numbers. The timestamps and sequence numbers may then be used to measure round-trip-times and to determine a direction in which a fault has occurred, etc.

The method then provides a report to the user. For example, the method may report to the user that a fault is detected and the fault is isolated to a particular segment. The method may also provide performance data (e.g., round-trip-times).

As described above, the packets for the LBT request/response loops follow the same paths as the packets intended for the subscriber's UE. The protocol stacks for transport of the packets for the LBT request/response loops are the same as for subscriber packets. In one embodiment, the present method enables a particular loop to be exercised without imposing a packet inspection deeper than the GTP-U header by intermediate transport network devices.

In particular, the LBT server that originates the LBT request/response loop sets a UDP destination port number of the request to indicate the destination to which the request is intended. For example, the UDP port number in the LBT request originated by the LBT server may be that of the eNodeB or the SGW. The source port number in the LBT request indicates the port number of the LBT server used to originate the LBT request. It should be noted that using UDP source and/or destination port numbers is one illustrative implementation to indicate the destination to which the request is intended. However, other fields in the IP header, such as source and destination IP addresses, protocol-id, and others, may also be used for this purpose.

When the LBT request arrives at a PGW, the PGW inspects packets received from an IP address of the LBT server. The PGW determines the UDP port number indicating the destination device to which the LBT request is intended. The PGW then encapsulates the packets and sets the value of the GTP-U header message-type to indicate that the destination is either the eNodeB or the SGW. When the GTP-U encapsulated packet arrives at the SGW, the message-type is inspected to determine the appropriate action to be taken by the SGW. Based on the message-type, the SGW either processes and reflects the LBT request or forwards the LBT request towards the eNodeB. For example, if the message-type indicates that the request is intended for the SGW, the SGW sends back a response towards the LBT server. If the message-type indicates that the request is intended for the eNodeB, the SGW forwards the request towards the eNodeB. Similarly, when the packet arrives at the eNodeB, the eNodeB inspects the packet to determine the appropriate action. In this case, the eNodeB processes the request and provides a response—without forwarding the request to the UE.

Figure 3:
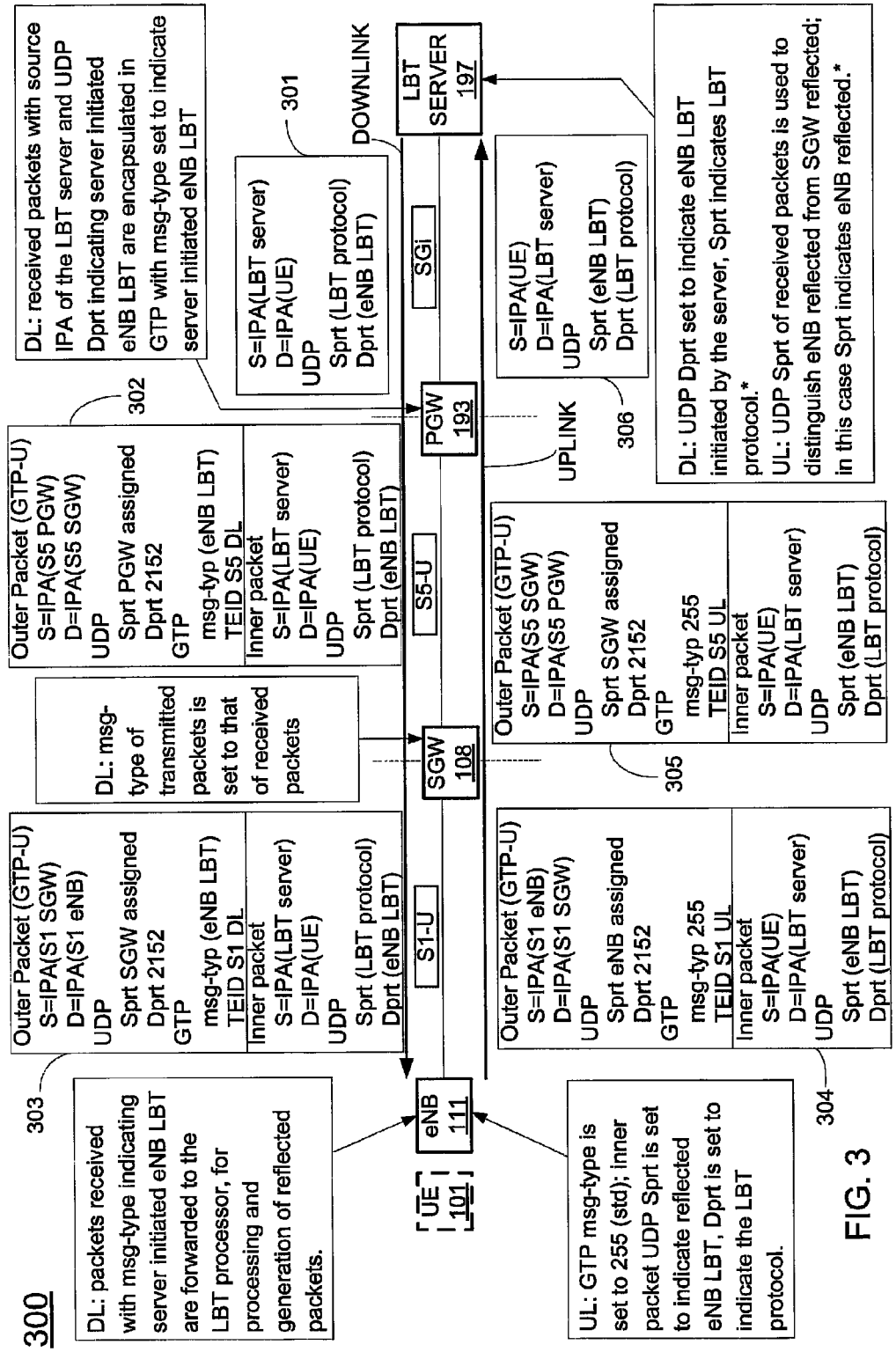
FIG. 3 illustrates an exemplary protocol stack for an LBT request/response loop initiated by an LBT server to an eNodeB.

FIG. 3 illustrates an exemplary protocol stack 300 for an LBT request/response loop initiated by an LBT server to an eNodeB. Note that, for this particular example, the PCEF function is included in the PGW.

First, in the downlink direction (from LBT server towards UE), the LBT server 197 sets the UDP port number (UDP Dprt) to indicate that the request is to the eNodeB 111 and the request is initiated by the LBT server 197.

For example, the protocol stack may be as illustrated in 301:

```
S=IPA(LBT server)
D=IPA(UE)
UDP
    Sprt (LBT protocol)
    Dprt (eNB LBT)
```

When the request reaches the PGW 193, the PGW inspects the received packets with the source IP address of the LBT server and UDP Dprt indicating server initiated LBT request for an eNodeB, the PGW encapsulates the packets in a GTP with a msg-type set to indicate an LBT server initiated request for the eNodeB. For example, the protocol stack from the PGW may then be as illustrated in 302.

```
Outer Packet (GTP-U)
    S=IPA(S5 PGW)
    D=IPA(S5 SGW)
    UDP
        Sprt PGW assigned
        Dprt 2152
    GTP
        msg-typ (eNB LBT)
        TEID S5 DL
    Inner packet
        S=IPA(LBT server)
        D=IPA(UE)
        UDP
            Sprt (LBT protocol)
            Dprt (eNB LBT)
```

When the request reaches the SGW 108, the SGW 108 inspects the message type and determines that the request is intended for the eNodeB and forwards the request to the eNodeB. The protocol stack from the SGW may then be as illustrated in 303.

```
Outer Packet (GTP-U)
    S=IPA(S1 SGW)
    D=IPA(S1 eNB)
    UDP
        Sprt SGW assigned
        Dprt 2152
    GTP
        msg-typ (eNB LBT)
        TEID S1 DL
    Inner packet
        S=IPA(LBT server)
        D=IPA(UE)
        UDP
            Sprt (LBT protocol)
            Dprt (eNB LBT)
```

When the request reaches the eNodeB, the eNodeB inspects the message type. The eNodeB then processes the request and generates a response to the request (i.e., reflects the request). The response is then to be forwarded in the uplink direction (in the direction from UE towards the LBT server). The protocol stack from the eNodeB may then be as illustrated in 304.

```
Outer Packet (GTP-U)
    S=IPA(S1 eNB)
    D=IPA(S1 SGW)
    UDP
        Sprt eNB assigned
        Dprt 2152
    GTP
        msg-typ 255
        TEID S1 UL
    Inner packet
        S=IPA(UE)
        D=IPA(LBT server)
        UDP
            Sprt (eNB LBT)
            Dprt (LBT protocol)
```

When the response packets from the eNodeB are received by the SGW 108, the SGW inspects the packets and forwards the response towards the PGW 193. The protocol stack from the SGW 108 in the uplink direction may then be as illustrated in 305.

```
Outer Packet (GTP-U)
    S=IPA(S5 SGW)
    D=IPA(S5 PGW)
```

```
            UDP
                Sprt SGW assigned
                Dprt 2152
            GTP
                msg-typ 255
                TEID S5 UL
            Inner packet
                S=IPA(UE)
                D=IPA(LBT server)
            UDP
                Sprt (eNB LBT)
                Dprt (LBT protocol)
```

The PGW 193 receives the response packets, removes the encapsulation and forwards the response towards the LBT server 197. The protocol stack from the PGW 193 in the uplink direction may then be as illustrated in 306.

```
            S=IPA(UE)
                D=IPA(LBT server)
                UDP
                    Sprt (eNB LBT)
                    Dprt (LBT protocol)
```

When the LBT server 197 receives the response, the LBT determines whether the LBT request/response was successful. Similarly, protocol stacks for LBT request/response loops may be addressed to an SGW. The responses received by the LBT server are similar with the exception of the source port number associated with the response. The LBT server then distinguishes responses reflected by an eNodeB from responses reflected by an SGW from the source port numbers (Sprt) of the received packets.

When all the desired loops are exercised, the method then isolates faults to a segment level and provides a response to the user. For example, the response to the user may identify a particular segment wherein the fault occurred and any relevant performance data (e.g., round trip times).

It should be noted that the above examples are only illustrative. In other words, other protocol fields, such as others in the GTP header, may be used instead of or in addition to GTP message-type to carry the indication of the desired destination of the request message from the LBT server. This information may also be used to provide more information about the contents and purpose of the request and response messages. For example, it could provide information about the data inside the payload of the request/response messages and how those fields are to be processed in the elements that the messages pas through.

Figure 4:
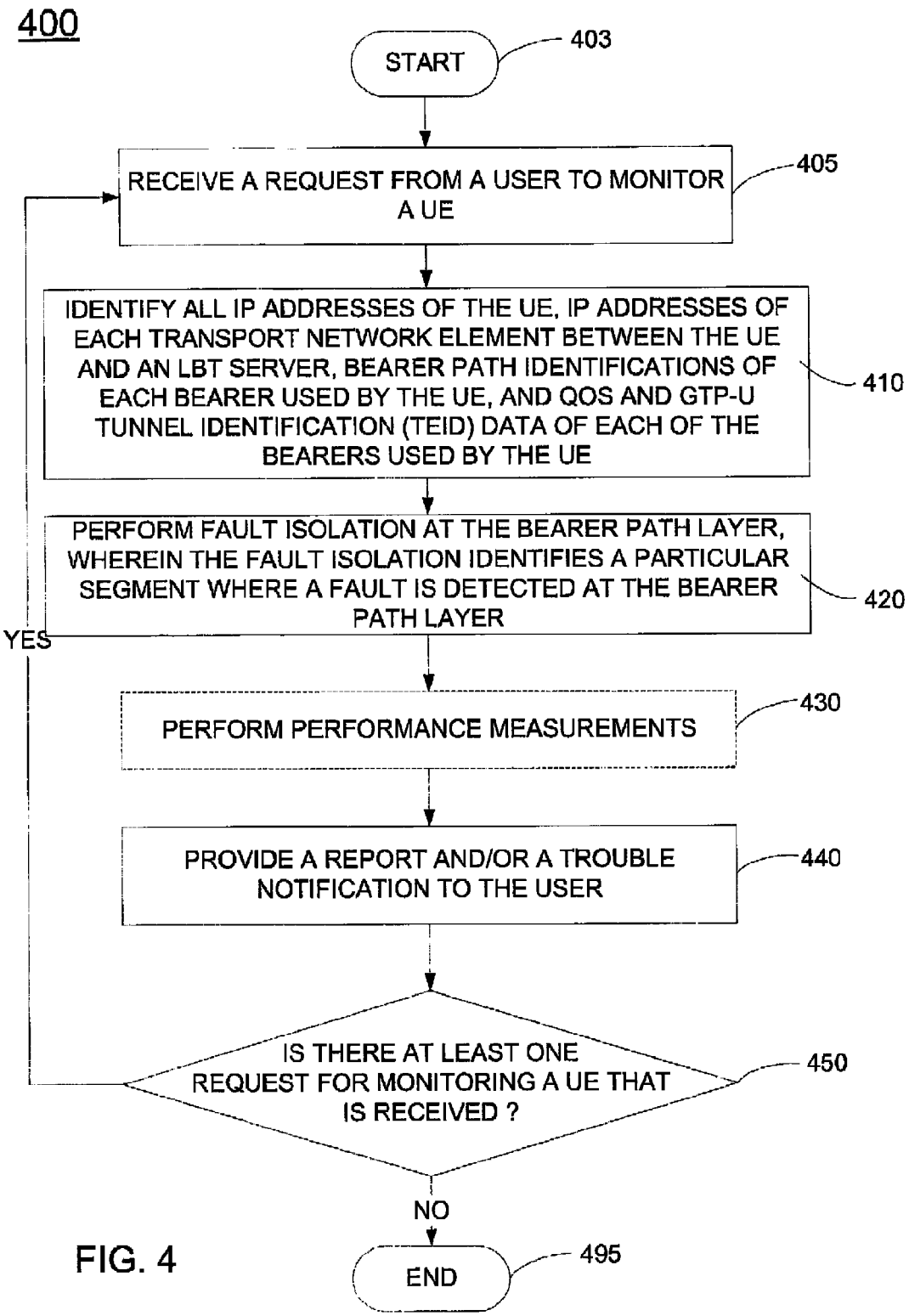
FIG. 4 illustrates a flowchart of a method for monitoring connectivity in a network at a bearer path layer and at a transport layer.

FIG. 4 illustrates a flowchart of a method 400 for monitoring connectivity in a network at a bearer path layer. For example, the method 400 may be implemented in a controller. Method 400 starts in step 403 and proceeds to step 405.

In step 405, method 400 receives a request from a user to monitor a UE. For example, a UE may be experiencing a degradation of service. A user (e.g., work center personnel) may then send a request to a controller for monitoring of the UE at a bearer path layer such that fault isolation may be performed at the bearer path layer.

In step 410, method 400 identifies: all internet protocol addresses of the UE, internet protocol addresses of each transport network element between the UE and an LBT server, bearer path identifications of each bearer used by the UE, and quality of service (QoS) and GTP-U tunnel identification (TEID) data of each of the bearers used by the UE. In one embodiment, the identifying of all Internet protocol addresses of the UE, internet protocol addresses of each transport network element between the UE and an LBT server, bearer path identifications of each bearer used by the UE, and quality of service (QoS) and GTP-U tunnel identification data of each of the bearers used by the UE is performed via a discovery subsystem.

In one embodiment, the discovery subsystem may receive from the controller a command to perform the discovery for a particular UE. The discovery subsystem may then first determine the internet protocol address of the MME being used by the particular UE from the home subscriber server. For example, for the UE 101 illustrated in FIG. 1, the discovery subsystem 133 may access the HSS 191 to determine the IP address of the MME 107. The discovery subsystem 133 may then read the MME 107 to determine: the IP addresses of the UE, eNodeB, SGW, PGW, PCEF, etc. between an LBT server and the UE; bearer identifications of each of the bearers used by the UE; and quality of service (QoS) and GTP-U tunnel identification (TEID) data of each of the bearers used by the UE. The discovery subsystem may then provide the IP addresses of the UE, eNodeB, SGW, PGW, PCEF, etc. between an LBT server and the UE; bearer identifications of each of the bearers used by the UE; and quality of service (QoS) and GTP-U tunnel identification data of each of the bearers used by the UE to the controller.

In step 420, method 400 performs fault isolation at the bearer path layer, wherein the fault isolation identifies a particular segment where a fault is detected at the bearer path layer. The performing the fault isolation is accomplished in accordance with the internet protocol addresses of the UE, internet protocol addresses of each transport network element between the UE and an LBT server, bearer path identifications of each bearer used by the UE, and quality of service (QoS) and GTP-U tunnel identification (TEID) data of each of the bearers used by the UE. In one embodiment, the segment is located between an eNodeB serving the UE and the LBT server. Note that there are a plurality of segments between the eNodeB serving the UE and the LBT server. The goal is to isolate the fault to a particular segment of the plurality of segments. The fault isolation is accomplished by invoking one or more LBT request/response loops combined with one or more enhanced trace-route loops. In one embodiment, the loops are originated by an LBT server that receives a command from the controller to isolate a fault to a particular segment at the bearer path layer.

For example, the method may instruct the LBT server to send: a first LBT request to the eNodeB, a second LBT request to an SGW, a first enhanced trace-route request to a PGW, and a second enhanced trace-route request to a PCEF. For example, for the UE shown in FIG. 2, the controller may instruct the LBT server 197 to send the requests as follows. The first LBT request is associated with loop 201, the second LBT request is associated with loop 202, the first enhanced trace-route request is associated with loop 203 and the second enhanced trace-route request is associated with loop 204. A response is then received for each of the LBT requests and for each of the enhanced trace-route requests. The fault isolation is then performed in accordance with the responses. For example, if the LBT request/response for loop 201 is not successful and the LBT request/response for loop 202 is successful, a fault is detected between the eNodeB 111 and the SGW 108. In another example, if the LBT request/response for loop 202 is not successful and the ping/trace-route loop 203 is successful, a fault is detected between the SGW 108 and the PGW 193. In another example, if the ping/trace-route loop 203 is not successful and the ping/trace-route loop 204 is successful, a fault is detected between the PGW 193 and the PCEF 192. In another example, if the ping/trace-route loop 204 is not successful, a fault is detected between the PCEF 192 and the LBT server 197. In another example, a fault is detected where the fault is silent and no other messaging or alarming exists to identify the fault, e.g., silent packet forwarding loss.

In optional step 430, the method performs performance measurements, e.g., measure round-trip times for each segment between the eNodeB serving the UE and the LBT server. For example, time stamps and sequence numbers carried in LBT request/response loops and the enhanced trace-route loops may be used for determining round-trip times. It should be noted that various performance measurements can be made, e.g., measuring one-way delay of a packet associated with a particular segment, verifying a payload integrity of packets to detect any packet corruption along the path, performing a quality of service verification, performing an available bandwidth calculation or verification as defined pursuant to a service level agreement (SLA), and so on.

In step 440, method 400 provides a report to the user. The report may include the result of the fault isolation, round-trip times per segment, etc. For example, a report that indicates a fault at the bearer path layer on a particular segment between an eNodeB serving the UE and the LBT server may be sent from the controller to the user.

In one embodiment, when a fault is detected, an alarm is sent to northbound systems using Simple Network Management Protocol (SNMP) traps. For example, a table is built which identifies the failure type or category and the SNMP trap for each failure type. The table exists outside of LBT but is an expected input to LBT when LBT is running. This allows for changes in alarm types and traps as needed by a particular organization.

In step 450, method 400 determines if there are more requests that are received for monitoring a UE. If there is another request that is received, the method proceeds to step 405. Otherwise, the method proceeds to step 495 to end the current process.

In one embodiment, the fault isolation and performance monitoring at the bearer path layer may include isolation of faults that occur between the UE and the eNodeB. For example, an additional LBT request/response loop may be sent with a destination address of the request being that of the UE. If the fault isolation method includes isolation faults that occur between the UE and the eNodeB, the eNodeB, after inspecting a packet to determine the appropriate action, forwards to the UE the request intended for the UE.

In one embodiment, the eNodeB may comprise a software based UE module that resides within the eNodeB with or without engaging the Uu/air interface procedures. The software based UE module has no Radio Access Bearers (RABs) or Uu interface but is able to initiate PDN connection requests, bearer path setup requests, etc. in a similar manner as the real UE. For example, the service provider may not have permission from the subscriber to send the LBT request packets to the subscriber's UE. The current method is then able to include fault isolation for faults between a SW UE at the eNodeB and the rest of the network path—without the LBT requests having to reach a subscriber UE. For example, the software based UE module may receive the LBT request and provide a corresponding response.

In one embodiment, the method may utilize a UE dedicated for monitoring (e.g., a monitoring UE) such that the fault isolation and performance monitoring may include isolation of faults that occur between a UE and the eNodeB. For example, the service provider may not have permission from the subscriber to send the LBT request packets to the subscriber's UE. However, the service provider has permission to send packet to the monitoring UE. The monitoring UE may then receive the LBT request and provide a response.

In one embodiment, there may be remote devices off the internet somewhere that are "LBT Aware" (i.e., contain LBT stacks), such that you could set up bearer traces to just about any location where an LBT aware device is present. This would help enterprises interested in bearer performance measurement over their networks. LBT Aware devices would enable enterprises to check the bearer layer (GTP) against service levels, critical for mobility networks.

In the description above, the bearer paths are assumed to be established when the fault isolation is invoked. However, in the idle state, the S1 bearer path no longer exists. Thus, waking up the UE may be needed prior to measuring performance and invoking the fault isolation procedure. The LBT server may be configured to send packets towards the UE in order to initiate a return of the UE to a connected state, wherein the S1 bearer path is reestablished. The method may then invoke the fault isolation and performance measurement after the S1 bearer path is reestablished.

In one embodiment, the LBT request/response loops and the enhanced trace-route loops may be originated by an eNodeB and sent in the direction of the LBT server. For example, the requests may be sent by the eNodeB towards the LBT server and the responses may be sent back to the eNodeB. Accordingly, the present method provides a protocol stack for the requests originated by the eNodeB and responses provided by the various network elements between the eNodeB and the LBT server. As such, the protocol stack described in FIG. 3 is intended to be exemplary and not limiting the implementation of the present disclosure.

In one embodiment, the controller may instruct the LBT server to send the LBT request/response loops and the enhanced trace-route loops described above. In another embodiment, the LBT server may initiate the fault isolation and performance monitoring—without the need for receiving by the LBT server an instruction from a controller.

In one embodiment, the fault isolation and performance monitoring at the bearer path layer of the present disclosure also determines when a bearer management activity (e.g., handovers) is occurring. Thus, handover activity is not reported as a fault.

It should be noted that although not explicitly specified, one or more steps of the method 400 described herein may include a storing, displaying and/or outputting step as required for a particular application. In other words, any data, records, fields, and/or intermediate results discussed in the method can be stored, displayed, and/or outputted to another device as required for a particular application. Furthermore, steps or blocks in FIG. 4 that recite a determining operation, or involve a decision, do not necessarily require that both branches of the determining operation be practiced. In other words, one of the branches of the determining operation can be deemed as an optional step.

Figure 5:
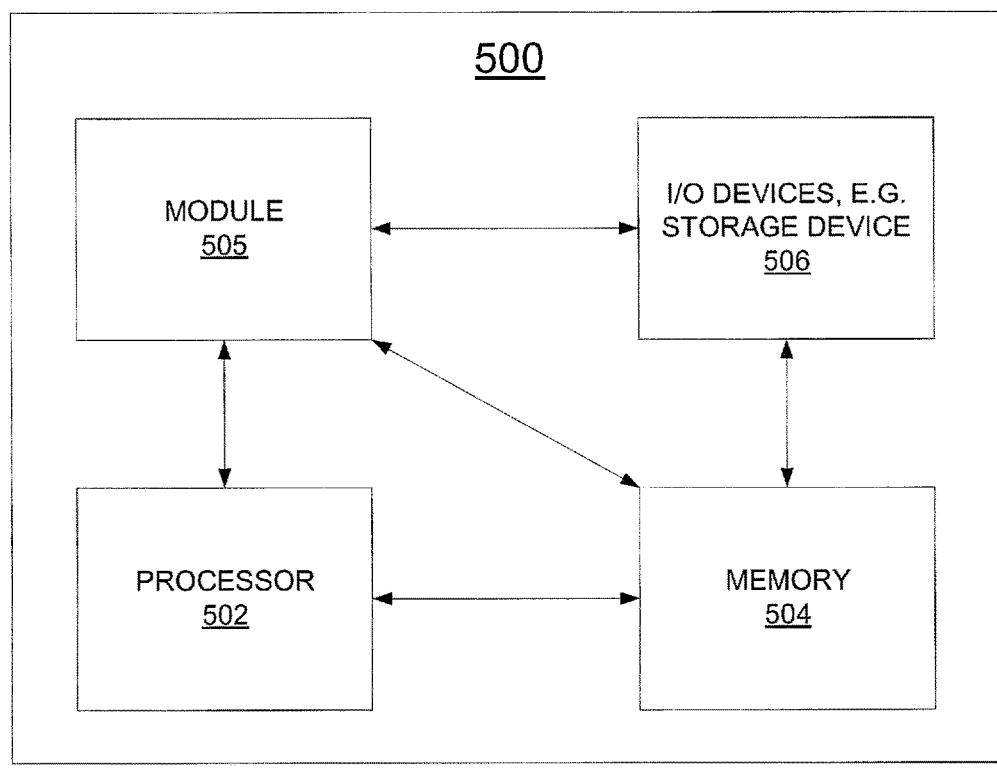
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for monitoring connectivity in a network at a bearer path layer, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 505 for monitoring connectivity in a network at a bearer path layer can be loaded into memory 504 and executed by processor 502 to implement the functions as discussed above. As such, the present process 505 for monitoring connectivity in a network at a bearer path layer (including associated data structures) of the present disclosure can be stored on a non-transitory (e.g., tangible and physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring a connectivity in a network, the method comprising:
   receiving, by a processor, a request to monitor a user endpoint;
   identifying, by the processor, an internet protocol address of the user endpoint, an internet protocol address of each transport network element between the user endpoint and a bearer trace server, a bearer path identification of each bearer used by the user endpoint, a quality of service associated with each bearer used by the user endpoint, and a tunnel identification of each bearer used by the user endpoint;
   waking up, by the processor, the user endpoint via an instruction sent to the bearer trace server located in a core network for a packet to be sent from the bearer trace server remotely located in the core network from the user endpoint in the network to reestablish a bearer;
   performing, by the processor, a performance measurement, wherein the performing the performance measurement comprises measuring a round-trip time of a packet associated with a particular segment; and
   performing, by the processor, a fault isolation at a bearer path layer after the user endpoint is woken up, wherein the fault isolation identifies the particular segment where a fault is detected at the bearer path layer.

2. The method of claim 1, wherein the performing the fault isolation comprises:
   invoking a request/response loop.

3. The method of claim 2, wherein the request/response loop is originated by the bearer trace server.

4. The method of claim 1, wherein the performing the fault isolation comprises:
   invoking a ping/trace-route loop.

5. The method of claim 4, wherein the ping/trace-route loop is originated by the bearer trace server.

6. The method of claim 1, wherein the performing the performance measurement further comprises at least one of:
   verifying a payload integrity of packets to detect any packet corruption;
   verifying a quality of service; and
   verifying an available bandwidth.

7. The method of claim 1, further comprising:
   providing a report to a user of the fault.

8. The method of claim 1, further comprising:
   determining when a bearer management activity is occurring for the user endpoint.

9. The method of claim 8, wherein bearer management activity is a handover activity.

10. The method of claim 1, wherein the user endpoint is a monitoring user endpoint.

11. The method of claim 1, wherein the user endpoint is a software module that resides within an eNodeB, wherein the eNodeB is serving as the user endpoint.

12. The method of claim 1, wherein the performing the fault isolation further comprises:
   isolating of a fault that occurs between the user endpoint and an eNodeB serving the user endpoint.

13. The method of claim 1, wherein the Internet protocol address of each transport network element between the user endpoint and the bearer trace server comprises an internet protocol address of an eNodeB serving the user endpoint.

14. The method of claim 1, wherein the Internet protocol address of each transport network element between the user endpoint and the bearer trace server comprises an internet protocol address of a serving gateway serving the user endpoint.

15. The method of claim 1, wherein the internet protocol address of each transport network element between the user endpoint and the bearer trace server comprises an internet protocol address of a public data network gateway serving the user endpoint.

16. The method of claim 1, wherein the Internet protocol address of each transport network element between the user endpoint and the bearer trace server comprises an internet protocol address of a policy and charging enforcement point serving the user endpoint.

17. A tangible computer-readable medium storing a plurality of instructions which, when executed by a processor, cause the processor to perform operations for monitoring a connectivity in a network, the operations comprising:
   receiving a request to monitor a user endpoint;
   identifying an Internet protocol address of the user endpoint, an internet protocol address of each transport network element between the user endpoint and a bearer trace server, a bearer path identification of each bearer used by the user endpoint, a quality of service associated with each bearer used by the user endpoint, and a tunnel identification of each bearer used by the user endpoint;
   waking up the user endpoint via an instruction sent to the bearer trace server located in a core network for a packet to be sent from the bearer trace server remotely located in the core network from the user endpoint in the network to reestablish a bearer;
   performing a performance measurement, wherein the performing the performance measurement comprises measuring a round-trip time of a packet associated with a particular segment; and
   performing a fault isolation at a bearer path layer after the user endpoint is woken up, wherein the fault isolation identifies the particular segment where a fault is detected at the bearer path layer.

18. The tangible computer-readable medium of claim 17, wherein the performing the fault isolation comprises:
invoking a ping/trace-route loop.

19. An apparatus for monitoring a connectivity in a network, the apparatus comprising:
a processor; and
a computer-readable medium storing a plurality of instructions which, when executed by the processor, cause the processor to perform operations, the operations comprising:
receiving a request to monitor a user endpoint;
identifying an Internet protocol address of the user endpoint, an internet protocol address of each transport network element between the user endpoint and a bearer trace server, a bearer path identification of each bearer used by the user endpoint, a quality of service associated with each bearer used by the user endpoint, and a tunnel identification of each bearer used by the user endpoint;
waking up the user endpoint via an instruction sent to the bearer trace server located in a core network for a packet to be sent from the bearer trace server remotely located in the core network from the user endpoint in the network to reestablish a bearer;
performing a performance measurement, wherein the performing the performance measurement comprises measuring a round-trip time of a packet associated with a particular segment; and
performing a fault isolation at a bearer path layer after the user endpoint is woken up, wherein the fault isolation identifies the particular segment where a fault is detected at the bearer path layer.

20. The apparatus of claim 19, wherein the performing the fault isolation comprises:
invoking a ping/trace-route loop.

* * * * *